(12) United States Patent
Wang et al.

(10) Patent No.: US 11,526,225 B2
(45) Date of Patent: Dec. 13, 2022

(54) TOUCH STRUCTURE, TOUCH DISPLAY PANEL AND TOUCH DISPLAY APPARATUS

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Yangpeng Wang, Beijing (CN); Benlian Wang, Beijing (CN); Weinan Dai, Beijing (CN)

(73) Assignees: Chengdu BOE Optoelectronics Technology Co., Ltd., Sichuan (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 17/419,842

(22) PCT Filed: Jul. 21, 2020

(86) PCT No.: PCT/CN2020/103266
§ 371 (c)(1),
(2) Date: Jun. 30, 2021

(87) PCT Pub. No.: WO2021/013148
PCT Pub. Date: Jan. 28, 2021

(65) Prior Publication Data
US 2022/0083163 A1    Mar. 17, 2022

(30) Foreign Application Priority Data
Jul. 22, 2019  (CN) .......................... 201910659941.9

(51) Int. Cl.
*G06F 3/041*    (2006.01)
*G06F 3/044*    (2006.01)

(52) U.S. Cl.
CPC .......... *G06F 3/0412* (2013.01); *G06F 3/0446* (2019.05); *G06F 2203/04111* (2013.01); *G06F 2203/04112* (2013.01)

(58) Field of Classification Search
CPC ......... G06F 2203/04112; G06F 3/0412; G06F 3/0446; G06F 2203/04111
See application file for complete search history.

(56) References Cited

U.S. PATENT DOCUMENTS

2014/0375907 A1    12/2014  Wu
2018/0120615 A1*    5/2018  Wang ................... G06F 3/0443
(Continued)

FOREIGN PATENT DOCUMENTS

| CN | 107450772 | 12/2017 |
|----|-----------|---------|
| CN | 109508117 | 3/2019  |

(Continued)

OTHER PUBLICATIONS

PCT International Search Report (w/ English Translation) for corresponding PCT Application No. PCT/CN2020/103266, dated Oct. 10, 2020, 14 pages.

(Continued)

*Primary Examiner* — Robin J Mishler
(74) *Attorney, Agent, or Firm* — Dority & Manning, P.A.

(57) ABSTRACT

A touch structure includes at least one touch electrode strip, and each touch electrode strip includes a plurality of electrically connected touch electrodes. At least one touch electrode includes a first conductive layer, a second insulating layer, a second conductive layer and at least one conductive connection portion. The first conductive layer includes at least one conductive unit. The second insulating layer covers the first conductive layer, and the second insulating layer is provided with at least one through hole therein to expose a portion of each first conductive unit. The second conductive layer is formed on the second insulating layer, and the second conductive layer includes at least one second conductive unit. Each conductive connection portion is disposed in one through hole, and two ends of the (Continued)

conductive connection portion are connected to one second conductive unit and one first conductive unit, respectively.

17 Claims, 8 Drawing Sheets

(56) References Cited

U.S. PATENT DOCUMENTS

| | | |
|---|---|---|
| 2018/0158876 A1 | 6/2018 | Shi |
| 2019/0043402 A1 | 2/2019 | Zeng et al. |
| 2019/0302920 A1 | 10/2019 | Li |
| 2020/0089384 A1 | 3/2020 | Wang et al. |
| 2021/0223916 A1 | 7/2021 | Zheng et al. |
| 2021/0333941 A1 | 10/2021 | Li |

FOREIGN PATENT DOCUMENTS

| | | |
|---|---|---|
| CN | 208589004 | 3/2019 |
| CN | 110377180 | 10/2019 |
| GB | 2559572 | 8/2018 |

OTHER PUBLICATIONS

Chinese First Office Action (w/ English Translation) for corresponding CN Application No. 201910659941.9, 24 pages.
Chinese Notification to Grant Patent Right for Invention (w/ English Translation) for corresponding CN Application No. 201910659941.9, 7 pages.

* cited by examiner

TOUCH STRUCTURE, TOUCH DISPLAY PANEL AND TOUCH DISPLAY APPARATUS

CROSS-REFERENCE TO RELATED APPLICATIONS

This application is a national phase entry under 35 USC 371 of International Patent Application No. PCT/CN2020/103266 filed on Jul. 21, 2020, which claims priority to Chinese Patent Application No. 201910659941.9, filed on Jul. 22, 2019, which are Incorporated herein by reference in their entirety.

TECHNICAL FIELD

The present disclosure relates to the field of touch technologies, and in particular, to a touch structure, a touch display panel and a touch display apparatus.

BACKGROUND

With the development of display technologies, bendable display apparatuses have become a development direction of display apparatuses.

SUMMARY

In one aspect, a touch structure is provided. The touch structure includes at least one touch electrode strip, and each touch electrode strip includes a plurality of electrically connected touch electrodes. At least one touch electrode includes a first conductive layer, a second insulating layer, a second conductive layer and at least one conductive connection portion. The first conductive layer includes at least one first conductive unit. The second insulating layer covers the first conductive layer, and the second insulating layer is provided with at least one through hole therein to expose a portion of each first conductive unit. The second conductive layer is formed on the second insulating layer, and the second conductive layer includes at least one second conductive unit. Each conductive connection portion is disposed in one through hole, and two ends of the conductive connection portion are connected to one second conductive unit and one first conductive unit, respectively.

In some embodiments, each first conductive unit has first overlapping portions, each second conductive unit has second overlapping portions, orthographic projections of the second overlapping portions and the first overlapping portions on the second insulating layer coincide, and the conductive connection portion connects a first overlapping portion and a second overlapping portion.

In some embodiments, the at least one first conductive unit and the at least one second conductive unit are arranged in at least one row, and each first conductive unit and each second conductive unit in each row are alternately arranged in a first direction. Orthographic projections of a first overlapping portion of the first conductive unit and a second overlapping portion of a second conductive unit that is adjacent to the first conductive unit in the first direction on the second insulating layer coincide, and the first overlapping portion and the second overlapping portion are connected through a conductive connection portion.

In some embodiments, the first conductive unit includes a first conductive body extending in the first direction, and the first conductive body has the first overlapping portions. The second conductive unit includes a second conductive body extending in the first direction, and the second conductive body has the second overlapping portions. Orthographic projections of a first overlapping portion of the first conductive body and the second overlapping portion of the second conductive body that is adjacent to the first conductive body in the first direction on the second insulating layer coincide, and the first overlapping portion and the second overlapping portion are connected through the conductive connection portion.

In some embodiments, the first conductive unit further includes a first electrical connection body extending in a second direction, and the first electrical connection body is connected to the first conductive body. The second conductive unit further includes a second electrical connection body extending in the second direction, and the second electrical connection body is connected to the second conductive body. The second direction and the first direction intersect.

In some embodiments, the at least one row includes a plurality of rows, and every two adjacent conductive units are first conductive units or second conductive units in the second direction. Every two adjacent first conductive units are directly connected, and every two adjacent second conductive units are directly connected in the second direction.

In some embodiments, first electrical connection bodies of every two adjacent first conductive units are directly connected in the second direction, Second electrical connection bodies of every two adjacent second conductive units are directly connected in the second direction.

In some embodiments, the at least one row includes a plurality of rows, every two adjacent conductive units are a first conductive unit and a second conductive unit in the second direction. The first conductive unit further has third overlapping portions, and the second conductive unit further has fourth overlapping portions. Orthographic projections of a third overlapping portion of the first conductive unit and a fourth overlapping portion of a second conductive unit that is adjacent to the first conductive unit in the second direction on the second insulating layer coincide, and the third overlapping portion and the fourth overlapping portion are connected through the conductive connection portion.

In some embodiments, the first electrical connection body has the third overlapping portions, and the second electrical connection body has the fourth overlapping portions. Orthographic projections of the third overlapping portion of the first electrical connection body and the fourth overlapping portion of the second electrical connection body that is adjacent to the first electrical connection body in the second direction on the second insulating layer coincide, and the first overlapping portion and the second overlapping portion are connected through the conductive connection portion.

In some embodiments, the second direction and the first direction are perpendicular to each other.

In some embodiments, in a same first conductive unit, orthographic projections of a central region of a first electrical connection body and a central region of a first conductive body on the second insulating layer coincide. In a same second conductive unit, orthographic projections of a central region of a second electrical connection body and a central region of a second conductive body on the second insulating layer coincide.

In some embodiments, the touch electrode further includes a conductive frame, and the conductive frame surrounds and electrically connects each first conductive unit and each second conductive unit included in the touch electrode.

In some embodiments, the touch electrode structure further includes a first insulating layer, and the first insulating layer is located on a side of the first conductive layer facing away from the second insulating layer.

In some embodiments, the touch electrode structure further includes a protective layer covering the second conductive layer.

In some embodiments, the at least one touch electrode strip includes a first touch electrode strip and a second touch electrode strip. The first touch electrode strip includes a plurality of first touch electrodes arranged in a third direction, and the first touch electrodes are electrically connected. The second touch electrode strip includes a plurality of second touch electrodes arranged in a fourth direction, and the second touch electrodes are electrically connected. The fourth direction and the third direction intersect, each first touch electrode and each second touch electrode are insulated from each other, and at least one of the first touch electrode and the second touch electrode is the touch electrode.

In some embodiments, the touch structure further includes: a plurality of first bridge portions, a plurality of second bridge portions and a plurality of intermediate insulating layers disposed in a same layer as the second insulating layer, each intermediate insulating layer being disposed between a first bridge portion and a respective second bridge portion. The first touch electrode and the second touch electrode have a gap therebetween. Adjacent first touch electrodes are electrically connected through a first bridge portion. Adjacent second touch electrodes are electrically connected through a second bridge portion. The first bridge portion and one of the first conductive unit and the second conductive unit are disposed in a same layer, and the second bridge portion and another of the first conductive unit and the second conductive unit are disposed in a same layer.

In some embodiments, the first bridge portion and a second conductive unit of the first touch electrode are disposed in a same layer, and the first bridge portion is connected to second conductive units of adjacent first touch electrodes. The second bridge portion and a first conductive unit of the second touch electrode are disposed in a same layer, and the second bridge portion is connected to first conductive units of adjacent second touch electrodes. Or, the second bridge portion and a first conductive unit of the second touch electrode are disposed in a same layer, and the second bridge portion is connected to second conductive units of adjacent second touch electrodes through via holes in the intermediate insulating layer.

In some embodiments, in a same first conductive unit, orthographic projections of a central region of a first electrical connection body and a central region of a first conductive body on the second insulating layer coincide. In a same second conductive unit, orthographic projections of a central region of a second electrical connection body and a central region of a second conductive body on the second insulating layer coincide.

In another aspect, a touch display panel is provided. The touch display panel includes the touch structure as described in any of the above embodiments.

In yet another aspect, a touch display apparatus is provided. The touch display apparatus includes the above touch display panel.

It can be understood that, the above general description and the following detailed description are only exemplary and explanatory, and cannot limit the present disclosure.

BRIEF DESCRIPTION OF THE DRAWINGS

In order to describe technical solutions in the present disclosure more clearly, the accompanying drawings to be used in the description of some embodiments of the present disclosure will be introduced briefly. Obviously, the accompanying drawings to be described below are merely accompanying drawings of some embodiments of the present disclosure, and a person of ordinary skill in the art can obtain other drawings according to these drawings. In addition, the accompanying drawings in the following description can be regarded as schematic diagrams, and are not limitations on actual sizes of products, actual processes of methods and actual timings of signals to which the embodiments of the present disclosure relate.

DETAILED DESCRIPTION

Figure 1:
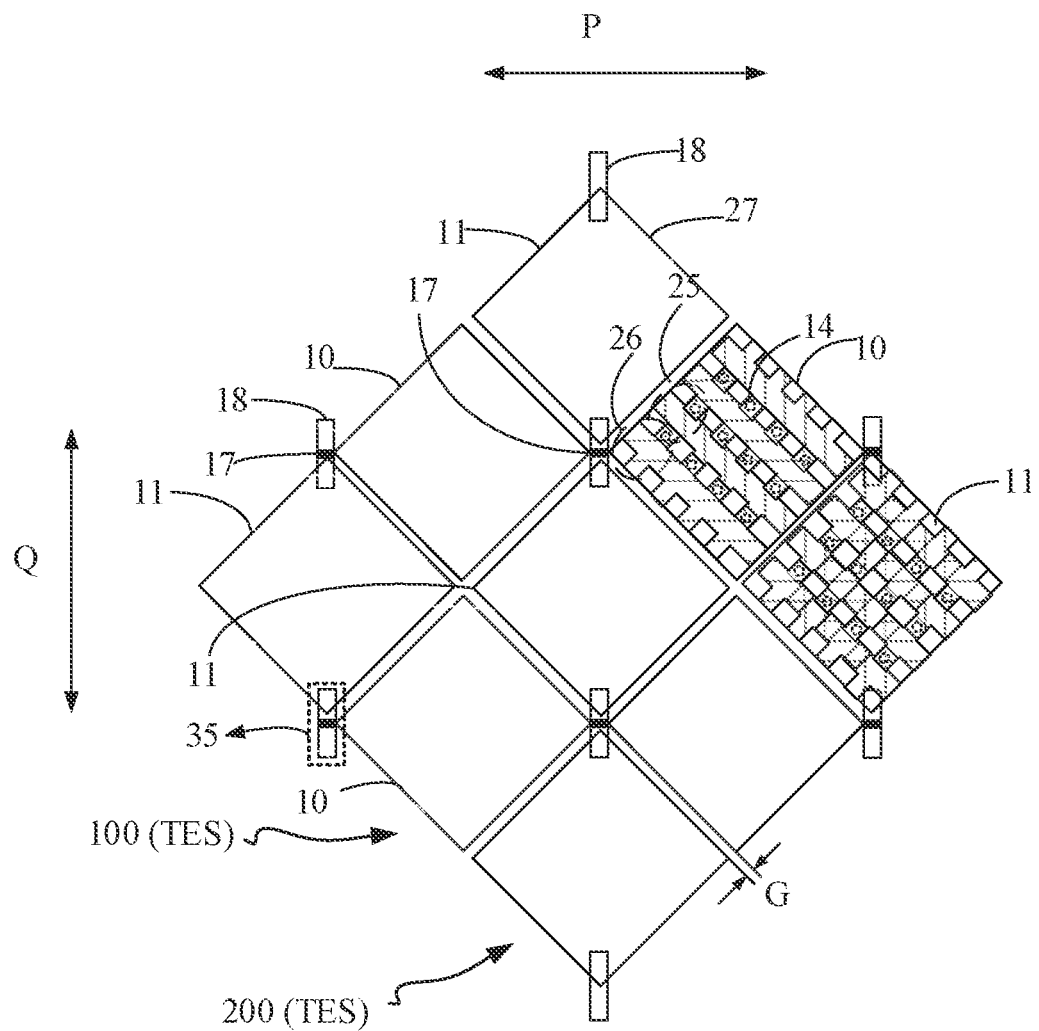
FIG. 1 is a top structural view of a touch structure, in accordance with embodiments of the present disclosure.

The technical solutions in embodiments of the present disclosure will be described clearly and completely with reference to accompanying drawings. Obviously, the described embodiments are merely some but not all of embodiments of the present disclosure. All other embodiments obtained on a basis of the embodiments of the present disclosure by a person of ordinary skill in the art shall be included in the protection scope of the present disclosure.

Unless the context requires otherwise, throughout the specification and the claims, the term "comprise" and other forms thereof such as the third-person singular form "comprises" and the present participle form "comprising" are construed as being open and inclusive, meaning "including, but not limited to." In the description of the specification, the terms "one embodiment", "some embodiments", "exemplary embodiments", "an example", "a specific example" or "some examples" and the like are intended to indicate that specific features, structures, materials, or characteristics related to embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

As following, the terms "first" and "second" are used for descriptive purposes only and are not to be construed as indicating or implying the relative importance or implicitly indicating the number of indicated technical features. Thus, features defined as "first", "second" may explicitly or implicitly include one or more of the features. In the description of the embodiments of the present disclosure, "a plurality of/the plurality of" means two or more unless otherwise specified.

In the description of some embodiments, the term such as "connected" and its derivative expressions may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electric contact. However, the term "coupled" or "communicatively coupled" may also mean that two or more components are not in direct contact with each other, but still cooperate or interact with each other. The embodiments disclosed herein are not necessarily limited to the content herein. It can be understood that, when an element is referred to as being "directly connected to" another element, other elements will not intervene therebetween.

The phrase "A and/or B" includes the following three combinations: only A, only B, and a combination of A and B.

The use of the phrase "applicable to" or "configured to" means an open and inclusive language, which does not exclude devices that are applicable to or configured to perform additional tasks or steps.

The term "about" or "approximately" as used herein includes a stated value and an average value within an acceptable range of deviation of a particular value. The acceptable range of deviation is determined by a person of ordinary skill in the art, considering measurement in question and errors associated with measurement of a particular quantity (i.e., limitations of a measurement system).

Exemplary embodiments are described herein with reference to sectional views and/or plan views as idealized exemplary drawings. In the accompanying drawings, thicknesses of layers and regions are enlarged for clarity. Thus, variations in shapes relative to the accompanying drawings due to, for example, manufacturing techniques and/or tolerances may be envisaged. Therefore, the exemplary embodiments should not be construed to be limited to the shapes of regions shown herein, but include deviations in the shapes due to, for example, manufacturing. For example, an etched region shown in a rectangular shape generally has a curved feature. Therefore, the regions shown in the accompanying drawings are schematic in nature, and their shapes are not intended to show actual shapes of the regions in a device, and are not intended to limit the scope of the exemplary embodiments.

Some embodiments of the present disclosure provide a touch display apparatus. The touch display apparatus may be a product (such as electronic equipment) or component with any display and touch functions such as a display, a TV, a digital camera, a mobile phone, a computer, a tablet computer, or a smart watch.

The touch display apparatus may be a liquid crystal display (LCD) apparatus with the touch function. The touch display apparatus may also be a self-luminous display apparatus with the touch function, such as an electroluminescence display apparatus with the touch function or a photoluminescence display apparatus with the touch function. In a case where the touch display apparatus is the electroluminescence display apparatus with the touch function, the electroluminescence display apparatus may be an organic light-emitting diode (OLED) display apparatus or a quantum dot light-emitting diode (QLED) display apparatus. In a case where the touch display apparatus is the photoluminescence display apparatus with the touch function, the photoluminescence display apparatus may be a quantum dot photoluminescence display apparatus.

In some embodiments, the touch display apparatus is the LCD display apparatus with the touch function. The touch display apparatus includes a cover glass, a touch display panel, and a backlight module. The backlight module is configured to provide backlight for the touch display panel. The touch display panel may include a touch structure and a liquid crystal display panel. The touch structure may be integrated in the liquid crystal display panel or disposed on an outside of the liquid crystal display panel.

In some embodiments, the touch display apparatus is the electroluminescence display apparatus with the touch function. The touch display apparatus mainly includes a touch display panel, a first optically clear adhesive (OCA) and a cover glass that are stacked in sequence. The touch display panel may include an electroluminescence display panel and a touch structure, and may further include a polarizer. The touch structure may be disposed on a light exit side of the electroluminescence display panel. In some examples, the touch structure is directly disposed on an encapsulating structure. That is, no film layer is disposed between the touch structure and the encapsulating structure. In some other examples, the touch structure is disposed on the encapsulating structure, and other film layers may also be disposed between the touch structure and the encapsulating structure, such as an insulating layer or a planarization layer. In some yet other examples, the touch structure is disposed between the cover glass and the polarizer. For example, the touch structure is disposed on the cover glass.

The electroluminescence display panel, such as the OLED display panel, has advantages such as lightness, thinness, flexibility, brilliant colors, high contrast, and fast response rate, and is one of mainstream display panels at present. In addition, the electroluminescence display apparatus may emit light by itself without a backlight module. Therefore, in the case where the touch display apparatus is the electroluminescence display apparatus, the touch display apparatus may be made into a flexible display apparatus.

In some embodiments, the touch display apparatus is the photoluminescence display apparatus with the touch function. The touch display apparatus mainly includes a touch structure, a photoluminescence display panel, and a backlight module. The touch structure may be disposed on a light exit side of the photoluminescence display panel.

Some embodiments of the present disclosure provide a touch structure. As shown in FIG. 1, the touch structure may include at least one (one or more) touch electrode strip (TES), and each touch electrode strip (TES) may include a plurality of electrically connected touch electrodes.

In some embodiments, as shown in FIG. 1, the at least one touch electrode strip (TES) may include first touch electrode strips 100 and second touch electrode strips 200. The first touch electrode strip may include a plurality of first touch electrodes 10 arranged in a third direction P, and the first touch electrodes 10 are electrically connected to form an output portion of the touch structure, i.e., a receive (RX) electrode. The second touch electrode strip may include a plurality of second touch electrodes 11 arranged in a fourth direction Q, and the second touch electrodes 11 are electrically connected to form an input portion of the touch structure, i.e., a transport or transmit (TX) electrode. Of course, the first touch electrode strip may also be used as the TX electrode, and the second touch electrode strip may also be used as the RX electrode. The third direction P and the fourth direction Q intersect. For example, as shown in FIG. 1, the third direction P and the fourth direction Q are perpendicular to each other.

The first touch electrode 10 and the second touch electrode 11 are insulated from each other, and at least one of the first touch electrode 10 and the second touch electrode 11 is a touch electrode as described below in some embodiments of the present disclosure.

A touch electrode has a conductive structure disposed in a same layer. For example, the touch electrode may have a metal mesh structure formed by patterning a same metal film, Since the conductive structure is disposed in the same layer, when the conductive structure is bended (including being folded or curled), stress will be concentrated on the layer. As a result, the conductive structure of the touch electrode of a touch structure in a bendable region may fracture. For example, touch electrodes located in a foldable region (which may be referred to as a bendable region) of a touch display panel that is included in a foldable display apparatus are prone to fracture. For another example, an entire or partial region (which may also be referred to as a bendable region) of a touch display panel included in a rollable display apparatus may be allowed to be rolled, and touch electrodes located in these regions are prone to fracture. Furthermore, a problem that bending reliability of the touch display panel and the touch display apparatus is not high may be caused.

However, a new conductive structure is provided in the touch electrode provided by some embodiments of the present disclosure. The conductive structure includes at least two conductive layers arranged in an overlapping manner, and stress may be dispersed to the at least two conductive layers when the conductive structure is bent. Therefore, the solution of embodiments of the present disclosure may reduce stress concentration, be beneficial to release the stress, and reduce a stress impact caused by bending. Furthermore, a situation in which the conductive structure in the touch electrode is prone to fracture may be avoided, a situation in which the conductive structure in the touch structure in the bendable region fractures may be avoided, and the bending reliability of the touch structure and the touch display apparatus may be improved.

Figure 2:
FIG. 2 is a structural diagram of a touch display panel, in accordance with embodiments of the present disclosure.

It can be noted that, in some examples, as shown in FIG. 2, touch electrodes with the new conductive structure may only be disposed in the bendable region of the touch display panel, and a region outside the bendable region of the touch display panel (i.e., a non-bendable region) may still use touch electrodes having the conductive structure disposed in the same layer. That is, the touch electrodes in the region may be disposed in the same layer, for example, may be disposed in a same layer as any conductive layer in the new conductive structure. In some other examples, all touch electrodes included in the entire touch display panel may have the new conductive structure. Since a plurality of touch electrodes in the bendable region and the non-bendable region are coupled to one another, touch electrodes with the new conductive structure that are disposed in the non-bendable region may further disperse the stress caused by the bending. In some yet other examples, touch electrodes with the new conductive structure may only be disposed in the non-bendable region of the touch display panel, and the bendable region of the touch display panel may still use touch electrodes having the conductive structure disposed in the same layer. In this case, the stress caused by the bending is transferred from the bendable region to the non-bendable region, and is dispersed by two conductive layers in the non-bendable region.

In some embodiments, at least one touch electrode in the at least one touch electrode strip (TES) may include a conductive structure and a second insulating layer. For example, as shown in FIG. 1, the conductive structure may include a first conductive layer, a second conductive layer, and at least one conductive connection portion 14.

The first conductive layer may include at least one first conductive unit 25. The first conductive unit 25 may be made of a metal material, such as copper or silver, which is not limited thereto, and may also be made of other conductive materials.

Figure 3A:
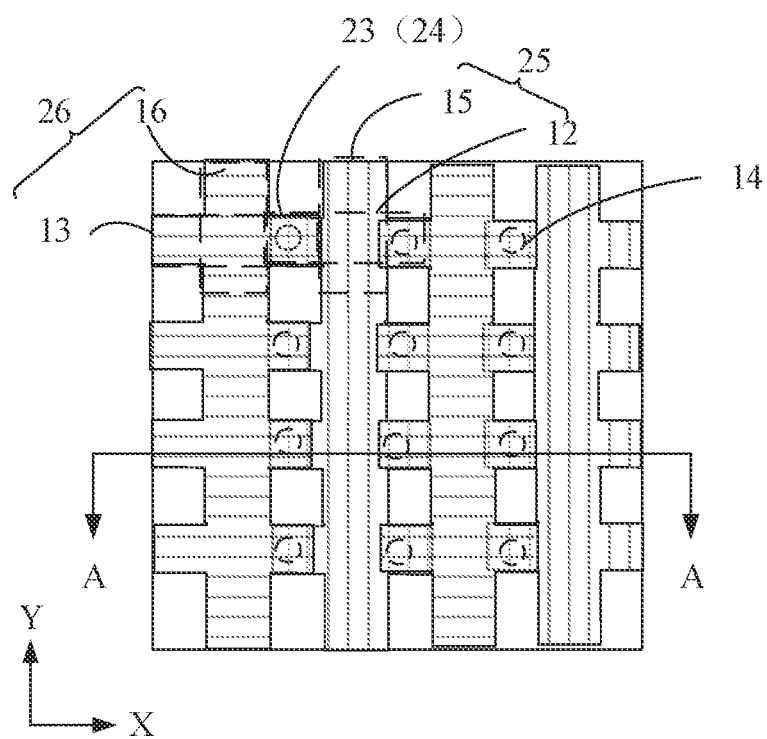
FIG. 3A is a top view of a touch electrode, in accordance with embodiments of the present disclosure.
Figure 3B:
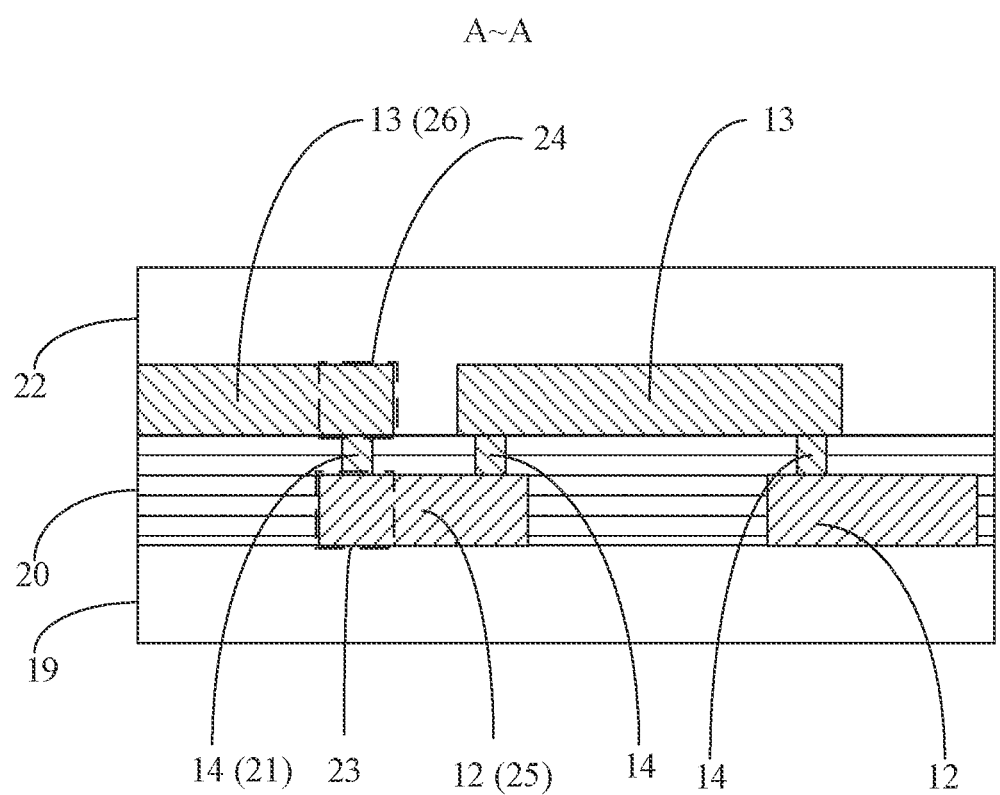
FIG. 3B is a sectional view of a touch electrode taken along the direction AMA in FIG. 3A, in accordance with embodiments of the present disclosure.

As shown in FIG. 3B, the second insulating layer 20 may cover the first conductive layer, and the second insulating layer 20 is provided with at least one through hole 21 therein to expose a portion of the first conductive unit 25. Embodiments of the present disclosure do not limit a material of the second insulating layer 20. For example, the second insulating layer 20 may be an inorganic insulating layer, that is, the second insulating layer 20 is made of an inorganic insulating material. The second insulating layer 20 may also be an organic insulating layer, that is, the second insulating layer 20 is made of an organic insulating material. For example, the organic insulating material may be resin. In embodiments of the present disclosure, in a case where the second insulating layer 20 is made of the organic insulating material (e.g., resin stress generated by bending the second insulating layer 20 may be reduced. The second insulating layer 20 may have certain elasticity, so that it is convenient for conductive units in the first conductive layer and the second conductive layer to release stress.

As shown in FIGS. 1 and 3B, the second conductive layer is formed on the second insulating layer 20, and the second conductive layer includes at least one second conductive unit 26. The second conductive unit may be made of a metal material, such as copper or silver, which is not limited thereto, and may also be made of other conductive materials.

In some embodiments, as shown in FIG. 3B, each conductive connection portion 14 is disposed in one through hole 21 formed in the second insulating layer 20. Specifically, an end face of the conductive connection portion 14 facing away from the first conductive unit may be located in the through hole 21, may extend out of the through hole 21, or may also be flush with a surface of the second insulating layer 20 facing away from the first conductive unit. The conductive connection portion(s) 14 may be in a one-to-one correspondence with the through hole(s) 21 in the second insulating layer 20. Two ends of the conductive connection portion 14 are connected to one second conductive unit 26 and one first conductive unit 25 respectively, so as to realize an electrical connection between the first conductive unit 25 and the second conductive unit 26.

In some embodiments, the conductive connection portion 14 and the first conductive unit 25 may be made of a same conductive material so as to be integrally formed, thereby reducing production costs and processing steps. In addition, the conductive connection portion 14 may also be made of a same conductive material as the second conductive unit 26.

Based on the above structure, it can be seen that the conductive structure of the at least one touch electrode may be arranged in a plurality of layers in an overlapping manner, and the plurality of layers are electrically connected. Compared to the solution that the entire conductive structure is arranged in the same layer, the solution provided by some embodiments may reduce stress concentration and be beneficial to release the stress.

It can be understood that, at least a portion of an orthographic projection of the second conductive unit 26 on the second insulating layer 20 may be located outside an orthographic projection of the first conductive unit 25 on the second insulating layer 20. That is, the orthographic projections of the second conductive unit 26 and the first conductive unit 25 on the second insulating layer 20 partially overlap, and the orthographic projections of the second conductive unit 26 and the first conductive unit 25 on the second insulating layer 20 together form a required pattern. In this way, since an alignment accuracy is required to be high when the two units completely overlap, a process difficulty in manufacturing may be reduced when the two units partially overlap.

In some embodiments, as shown in FIGS. 3A and 3B, in a same touch electrode, each first conductive unit 25 has first overlapping portions 23, and each second conductive unit 26 has second overlapping portions 24. Orthographic projections of the second overlapping portions 24 and the first overlapping portions 23 on the second insulating layer 20 coincide, and a conductive connection portion 14 connects a first overlapping portion 23 and a second overlapping portion 24. In this way, a contact area between the conductive connection portion 14 and the first conductive unit and a contact area between the conductive connection portion 14 and the second conductive unit may be ensured, and conductive performance of the touch electrode may be ensured.

It can be noted that, since the orthographic projections of the second overlapping portion 24 and the first overlapping portion 23 on the second insulating layer 20 coincide, in FIG. 3B, the first overlapping portion 23 and the second overlapping portion 24 point to a same position.

The orthographic projection of the second overlapping portion 24 on the second insulating layer 20 refers to a projection of the second overlapping portion 24 on the second insulating layer 20 in a thickness direction of the second insulating layer 20. Similarly, the orthographic projection of the first overlapping portion 23 on the second insulating layer 20 refers to a projection of the first overlapping portion 23 on the second insulating layer 20 in the thickness direction of the second insulating layer 20.

In some embodiments, as shown in FIG. 33, the touch structure may further include a first insulating layer 19, and the first insulating layer 19 is disposed on a side of the first conductive layer facing away from the second insulating layer 20. Embodiments of the present disclosure do not limit a material of the first insulating layer 19. For example, the first insulating layer 19 may be an inorganic insulating layer, that is, the first insulating layer 19 is made of an inorganic insulating material. The material of the first insulating layer 19 may also be an organic insulating layer, that is, the first insulating layer 19 is made of an organic insulating material. For example, the organic material may be resin. In embodiments of the present disclosure, in a case where the first insulating layer 19 is made of the organic insulating material (e.g., resin), the stress generated by bending the first insulating layer 19 may be reduced. The first insulating layer 19 may have certain elasticity, so that it is convenient for conductive units in the first conductive layer and the second conductive layer to release stress. In embodiments of the present disclosure, as shown in FIG. 3B, the first conductive layer may be formed on the first insulating layer 19.

It can be noted that, in a case where the touch structure further includes the first insulating layer 19, since the first insulating layer 19 and the second insulating layer 20 are approximately parallel, orthographic projections of the above components on the second insulating layer 20 may be regarded as orthographic projections of the components on the first insulating layer 19. For example, the orthographic projections of the second overlapping portion 24 and the first overlapping portion 23 on the second insulating layer 20 coincide, which is equivalent to orthographic projections of the second overlapping portion 24 and the first overlapping portion 23 on the first insulating layer 19 coinciding.

In some embodiments, as shown in FIG. 33, the touch structure may further include a protective layer 22, the protective layer 22 may cover the second conductive layer to protect the second conductive layer. Embodiments of the present disclosure do not limit a material of the protective layer 22. For example, the material of the protective layer 22 may be an inorganic material or an organic material. For example, the organic material may be, for example, resin. In embodiments of the present disclosure, in a case where the protective layer 22 is made of the resin, stress generated by bending the protective layer 22 may be reduced. The protective layer 22 may have certain elasticity, so that it is convenient for the conductive units in the first conductive layer and the second conductive layer to release stress.

One touch electrode in the touch structure is described in detail below with reference to drawings.

In some embodiments, as shown in FIG. 3A, in a same touch electrode, at least one (one or more) first conductive unit 25 and at least one second conductive unit 26 are arranged in at least one row (one or a plurality of rows). The first conductive unit 25 and the second conductive unit 26 in each row may be alternately arranged in a first direction X. Orthographic projections of a first overlapping portion 23 of a first conductive unit 25 and a second overlapping portion 24 of a second conductive unit 26 adjacent thereto in the first direction X on the second insulating layer 20 coincide, and the first overlapping portion 23 and the second overlapping portion 24 are connected through a conductive connection portion 14.

It can be noted that, embodiments of the present disclosure do not limit the first direction in which the first conductive unit 25 and the second conductive unit 26 are alternately arranged in each row.

In some examples, the first direction X may be parallel to one side of contour lines of the touch electrode. For example, the first direction X may be a horizontal direction in FIG. 3A. For another example, the first direction X may also be parallel to the third direction or the fourth direction as shown in FIG. 1.

For example, as shown in FIG. 3A, in an example where the first direction X is the horizontal direction, viewed from top to bottom, the touch electrode includes four rows. Each row includes first conductive units 25 and second conductive units 26 that are alternately arranged. The first conductive unit 25 has first overlapping portions 23, and the second conductive unit has second overlapping portions 24. Orthographic projections of a first overlapping portion 23 and a second overlapping portion 24 adjacent thereto in the first direction on the second insulating layer 20 coincide, and the first overlapping portion 23 and the second overlapping portion 24 are connected through a conductive connection portion 14.

In some embodiments, as shown in FIG. 3A, each first conductive unit 25 includes a first conductive body 12 extending in the first direction X, and the first conductive body 12 has the first overlapping portions 23. Each second conductive unit 26 includes a second conductive body 13 extending in the first direction X, and the second conductive body 13 has the second overlapping portions 24. Orthographic projections of a first overlapping portion 23 of the first conductive body 12 and a second overlapping portion 24 of the second conductive body 13 adjacent thereto in the first direction X on the second insulating layer 20 coincide, and the first overlapping portion 23 and the second overlapping portion 24 are connected through the conductive connection portion 14. Such a design may reduce the stress concentration, release the stress, and improve the bending reliability of the touch electrode.

It can be understood that, in a case where the touch structure is mounted on the display panel, in order to ensure a conductive area of the entire touch electrode, and to avoid pixel units in the display panel, a conductive structure in the touch electrode are usually arranged in a mesh shape. That is, an orthographic projection of the conductive structure on the second insulating layer 20 has a mesh shape. Therefore, in order to realize the mesh shape of the conductive structure in the touch electrode, in some embodiments, as shown in FIG. 3A, the first conductive unit 25 may further include a first electrical connection body 15 extending in a second direction Y. The first electrical connection body 15 is connected to the first conductive body 12, and the first electrical connection body 15 and the first conductive body 12 are disposed in a same layer and are integrally formed. The second conductive unit 26 may further include a second electrical connection body 16 extending in the second direction Y. The second electrical connection body 16 is connected to the second conductive body 13, and the second electrical connection body 16 and the second conductive body 13 are disposed in a same layer and are integrally formed. The first direction X and the second direction Y intersect.

Figure 4:
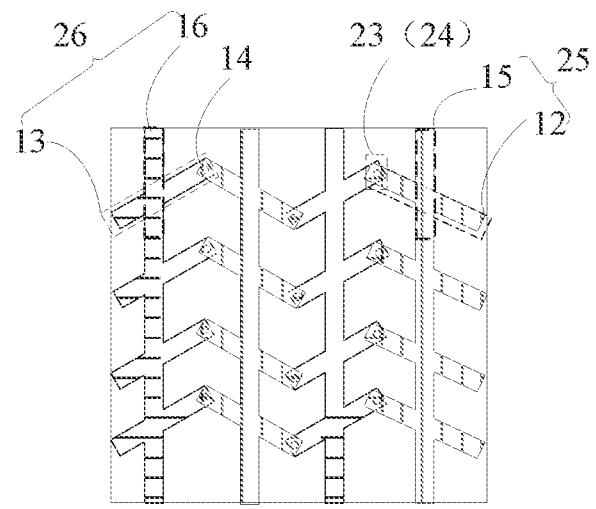
FIG. 4 is a top view of another touch electrode, in accordance with embodiments of the present disclosure.

In some other examples, as shown in FIG. 4, the first conductive unit 25 and the second conductive unit 26 are alternately arranged in the first direction. That is, a direction of a connecting line between a center of a first conductive unit 25 and a center of a second conductive unit 26 is parallel to the first direction. An extending direction of the second conductive body 13 in the second conductive unit 26 forms an included angle with the first direction. For example, the second conductive body 13 in the second conductive unit 26 and the first direction (e.g., the horizontal direction) forms an included angle of 45° in a counterclockwise direction, and the first conductive body 12 in the first conductive unit 25 forms an included angle of 135° with the horizontal direction in the counterclockwise direction. Viewed from top to bottom, the touch electrode includes four rows. Each row includes first conductive units 25 and second conductive units 26 that are alternately arranged. The first conductive body 12 has first overlapping portions 23, and the second conductive body 13 has second overlapping portions 24. Orthographic projections of a first overlapping portion 23 and a second overlapping portion 24 adjacent thereto on the second insulating layer 20 coincide, and the first overlapping portion 23 and the second overlapping portion 24 are connected through a conductive connection portion 14.

In some yet other examples, extending directions of the first electrical connection body 15 and the second electrical connection body 16 may each also form an included angle with the second direction Y.

In some yet other examples, the first conductive body 12, the second conductive body 13, the first electrical connection body 15 and the second electrical connection body 16 may not be linear patterns, for example, they may be rhombic patterns.

In some embodiments, at least one row of conductive units in each touch electrode includes a plurality of rows of conductive units. Every two adjacent conductive units are first conductive units 25 or second conductive units 26 in the second direction Y. Every two adjacent first conductive units 25 are directly connected (i.e., in direct contact), and every two adjacent second conductive units 26 are directly connected (i.e., in direct contact) in the second direction.

In some examples, in the case where the first direction X is the horizontal direction, as shown in FIG. 3A, the touch electrode includes four rows. The first conductive unit 25 and the second conductive unit 26 in each row are alternately arranged in the horizontal direction. From top to bottom, or from bottom to top, i.e., in the second direction, every two adjacent conductive units are first conductive units 25 or second conductive units 26, and every two adjacent first conductive units 25 are directly connected, and every two adjacent second conductive units 26 are directly connected. The first direction and the second direction are perpendicular to each other.

It can be understood that, when the touch structure is mounted on the display panel, in order to ensure the conductive area of the entire touch electrode, and to avoid the pixel units in the display panel, the conductive structure in the touch electrode is arranged in the mesh shape. That is, the orthographic projection of the conductive structure on the first insulating layer 19 (or the second insulating layer 20) has a mesh shape. Therefore, in order to realize the mesh shape of the conductive structure in the touch electrode, in this example, the second direction Y and the first direction X may be perpendicular to each other to reduce a processing difficulty of the touch electrode.

In some embodiments, as shown in FIGS. 3A and 4, in a case where the first conductive unit 25 includes the first electrical connection body 15 and the second conductive unit 26 includes the second electrical connection body 16, first electrical connection bodies 15 of every two adjacent first conductive units 25 are directly connected in the second direction Y, and first conductive units may be integrally formed, and second electrical connection bodies 16 of every two adjacent second conductive units 26 are directly connected in the second direction Y, and second conductive units 26 may be integrally formed. In this way, since the first electrical connection bodies 15 of every two adjacent first conductive units 25 in the second direction Y are directly connected, and the second electrical connection bodies 16 of every two adjacent second conductive units 26 in the second direction Y are directly connected, the processing difficulty of touch electrode may be reduced and the processing efficiency may be improved.

In some embodiments, at least one row of conductive units in each touch electrode includes a plurality of rows of conductive units. Every two adjacent conductive units are a first conductive unit 25 and a second conductive unit 26 in the second direction Y. The second direction Y intersects the first direction X. An orthographic projection of a third overlapping portion 36 of the first conductive unit 25 on the second insulating layer 20 and an orthographic projection of a fourth overlapping portion 37 of a second conductive unit 26 adjacent thereto in the second direction X on the second insulating layer 20 coincide, and the third overlapping portion 36 and the fourth overlapping portion 37 are connected through the conductive connection portion 14.

Figure 5:
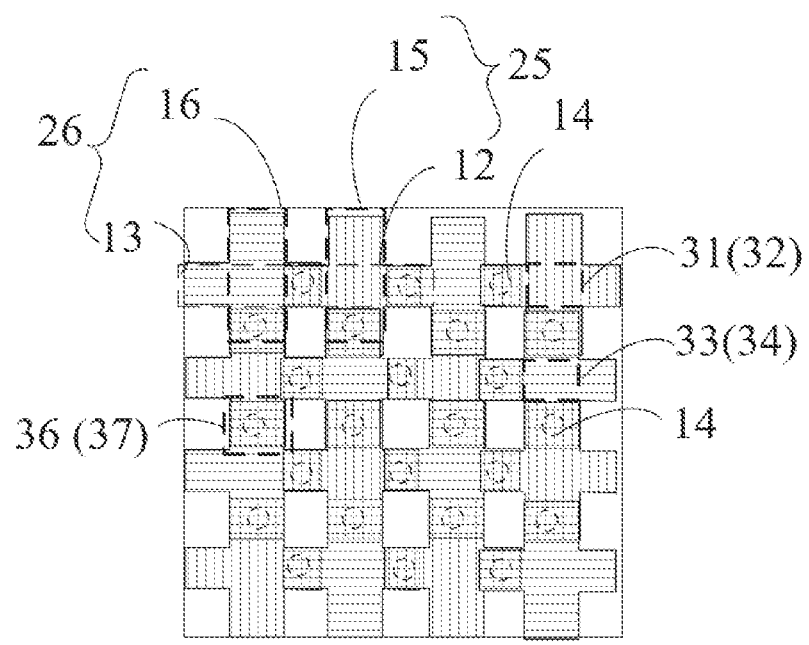
FIG. 5 is a top view of yet another touch electrode, in accordance with embodiments of the present disclosure.

In some examples, in the case where the first direction X is the horizontal direction, as shown in FIG. 5, the touch electrode includes four rows. The first conductive unit 25 and the second conductive unit 26 in each row are alternately arranged in the horizontal direction. From top to bottom, or from bottom to top, i.e., in the second direction, every two adjacent conductive units are the first conductive unit 25 and the second conductive unit 26. The first conductive unit 25 has third overlapping portions 36, and the second conductive unit 26 has fourth overlapping portions 37. Orthographic projections of a third overlapping portion 36 and a fourth overlapping portion 37 adjacent thereto in the second direction Y on the second insulating layer 20 coincide, and the third overlapping portion 36 and the fourth overlapping portion 37 are connected through the conductive connection portion 14. The first direction X and the second direction Y are perpendicular to each other.

Figure 6:
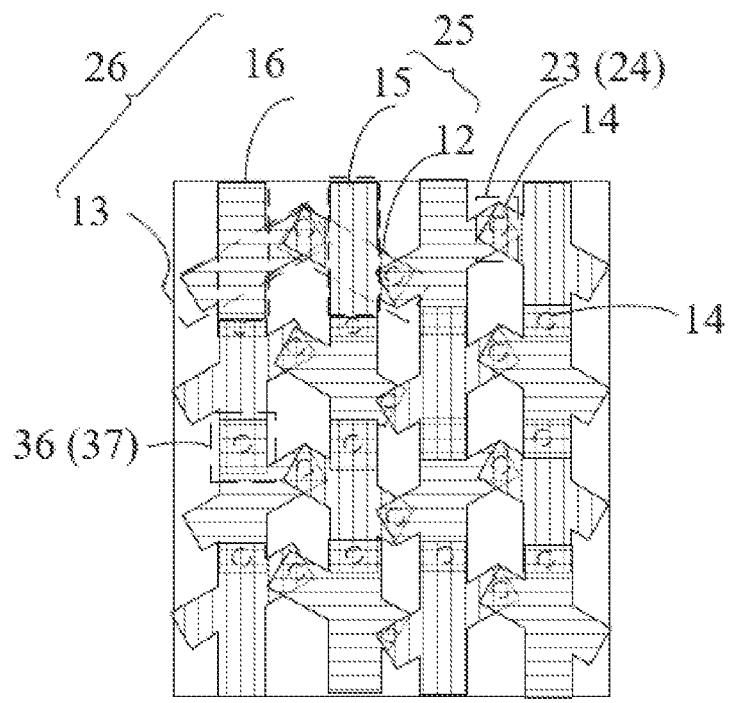
FIG. 6 is a top view of yet another touch electrode, in accordance with embodiments of the present disclosure.

In some other examples, as shown in FIG. 6, the first conductive unit 25 and the second conductive unit 26 are alternately arranged in the first direction X. That is, a direction of a connecting line between a center of a first conductive unit 25 and a center of a second conductive unit 26 is parallel to the first direction. An extending direction of the second conductive body 13 in the second conductive unit 26 forms an included angle with the first direction. For example, the second conductive body 13 in the second conductive unit 26 and the first direction (e.g., the horizontal direction) forms an included angle of 45° in a counterclockwise direction, and the first conductive body 12 in the first conductive unit 25 forms an included angle of 135° with the horizontal direction in the counterclockwise direction. Viewed from top to bottom, the touch electrode includes four rows. The first conductive unit 25 and the second conductive unit 26 in each row are alternately arranged. From top to bottom, or from bottom to top, i.e., in the second direction, every two adjacent conductive units are one first conductive unit 25 and one second conductive unit 26. The first conductive unit 25 has third overlapping portions 36, and the second conductive unit 26 has fourth overlapping portions 37. Orthographic projections of a third overlapping portion 36 and a fourth overlapping portion 37 adjacent thereto in the second direction Y on the second insulating layer 20 coincide, and the third overlapping portion 36 and the fourth overlapping portion 37 are connected through a conductive connection portion 14. The first direction X and the second direction Y intersect.

In some embodiments, as shown in FIGS. 5 and 6, in a case where the first conductive unit 25 includes the first electrical connection body 15 and the second conductive unit 26 includes the second electrical connection body 16, the first electrical connection body 15 has the third overlapping portions 36, and the second electrical connection body 16 has the fourth overlapping portions 37. Herein, orthographic projections of a third overlapping portion 36 of the first electrical connection body 15 and a fourth overlapping portion 37 of a second electrical connection body 16 adjacent thereto in the second direction Y on the second insulating layer 20 coincide, and the third overlapping portion 36 and the fourth overlapping portion 37 are connected through the conductive connection portion 14. Such a design may reduce the stress concentration, release the stress, and improve the bending reliability of the touch electrode.

In some embodiments, as shown in FIGS. 4 to 6, orthographic projections of a central region 31 of a first electrical connection body 15 and a central region 32 of a first conductive body 12 in a same first conductive unit 25 on the second insulating layer 20 coincide; and orthographic projections of a central region 33 of a second electrical connection body 16 and a central region 34 of a second conductive body 13 in a same second conductive unit 26 on the second insulating layer 20 coincide. In this way, it is convenient to control a shape of the orthographic projection of the conductive structure on the second insulating layer 20, so as to meet the design requirements.

In some embodiments, the touch electrode further includes a conductive frame 29. The conductive frame 29 surrounds and electrically connects each first conductive unit 25 and each second conductive unit 26 included in the touch electrode.

Figure 7:
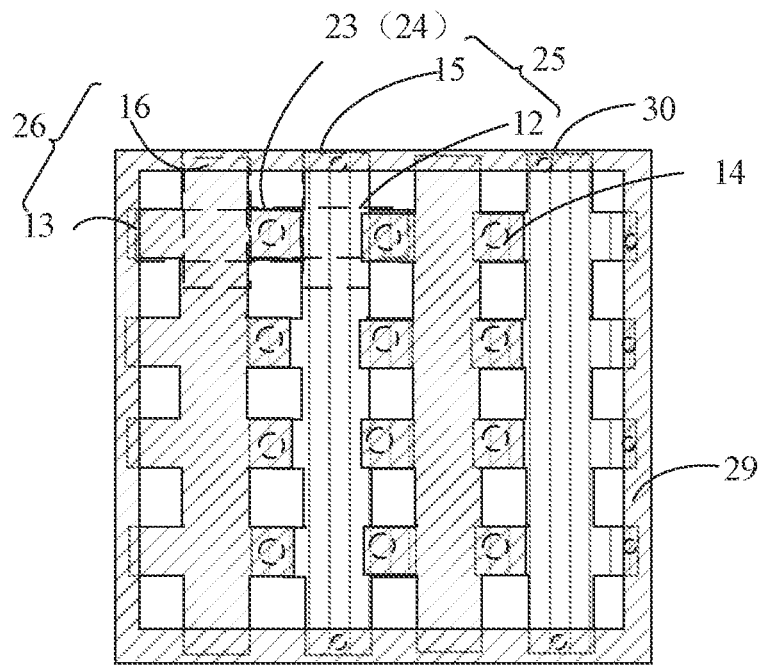
FIG. 7 is a top view of yet another touch electrode, in accordance with embodiments of the present disclosure.

In some examples, as shown in FIG. 7, the conductive frame 29 and the second conductive units 26 are disposed in a same layer. In this case, the conductive frame 29 may be connected to the first conductive units 25 through connection holes 30 in the second insulating layer 20.

In some other embodiments, as shown in FIG. 1, the touch electrode may be not provided with the conductive frame. In order to clearly distinguish different touch electrodes, FIG. 1 illustrates contour lines surrounding the first conductive units 25 and the second conductive units 26, i.e., the rhombic box in FIG. 1.

In some embodiments, there is a gap G between the first touch electrode 10 and the second touch electrode 11. Adjacent first touch electrodes 10 may be electrically connected through a first bridge portion 17, and adjacent second touch electrodes 11 may be electrically connected through a second bridge portion 18. The first bridge portion 17 is disposed in a same layer as one of the first conductive unit 25 and the second conductive unit 26, and the second bridge portion 18 is disposed in a same layer as another of the first conductive unit 25 and the second conductive unit 26. An intermediate insulating layer 35 is disposed between the first bridge portion and the second bridge portion, and the intermediate insulating layer 35 and the second insulating layer 20 are disposed in a same layer. That is, the intermediate insulating layer 35 and second insulating layer 20 of the first touch electrode 10 and the second touch electrode 11 are disposed on a same layer, and this layer may be a conductive layer. A material of the intermediate insulating layer is the same as materials of the second insulating layer 20 of the first touch electrode 10 and the second touch electrode 11, and these layers may be formed through an integrated patterning process.

In some examples, in a case where the first touch electrode 10 and the second touch electrode 11 are touch electrodes described in any of the foregoing embodiments, the first bridge portion 17 and the second conductive unit 26 of the first touch electrode 10 are disposed in a same layer. That is, the first bridge portion 17 and the second conductive unit 26 of the first touch electrode 10 may be disposed on a same layer, and this layer may be an insulating layer. A material of the first bridge portion 17 is the same as a material of the second conductive unit 26 of the first touch electrode 10, and they may be formed through an integrated patterning process. The first bridge portion 17 is connected to second conductive units 26 of adjacent first touch electrodes 10; and the second bridge portion 18 and the first conductive unit 25 of the second touch electrode 11 are disposed in a same layer. That is, the second bridge portion 18 and the first conductive unit 25 of the second touch electrode 11 may be disposed on a same base layer, and the base layer may be an insulating layer. A material of the second bridge portion 18 is the same as a material of the first conductive unit 25 of the second touch electrode 11, and they may be formed through an integrated patterning process. The second bridge portion 18 is connected to first conductive units 25 of adjacent second touch electrodes 11.

Figure 8:
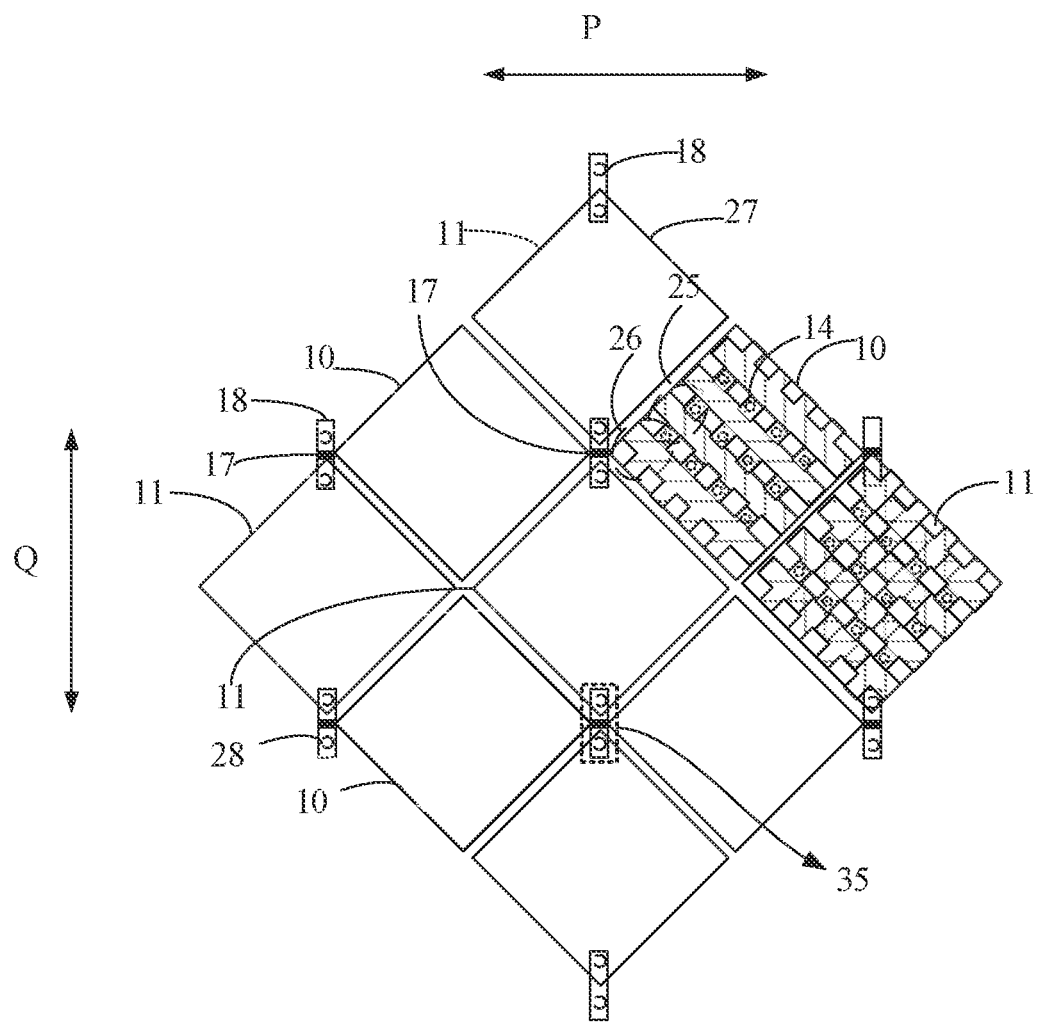
FIG. 8 is a top structural view of another touch structure, in accordance with embodiments of the present disclosure.

In some other examples, as shown in FIG. 8, the second bridge portion 18 and the first conductive unit 25 of the second touch electrode 11 are disposed in a same layer, and the second bridge portion 18 is connected to the second conductive units 26 of the adjacent second touch electrodes 11 through via holes 28 in the intermediate insulating layer.

It can be understood that, shapes and arrangement manners of the first conductive unit and the second conductive unit in the touch electrode described in the embodiments of the present disclosure are not limited to forms described above, which may be determined in accordance with specific conditions, as long as it is ensured that conductive structures in the touch electrodes are arranged in a plurality of layers and the layers are electrically connected.

Based on the above touch structure, embodiments of the present disclosure provide a method of manufacturing the touch electrode, which includes the following steps 400 to 600 (S400 to S406).

In S400, a first conductive film is formed on the first insulating layer 19.

Figure 9:
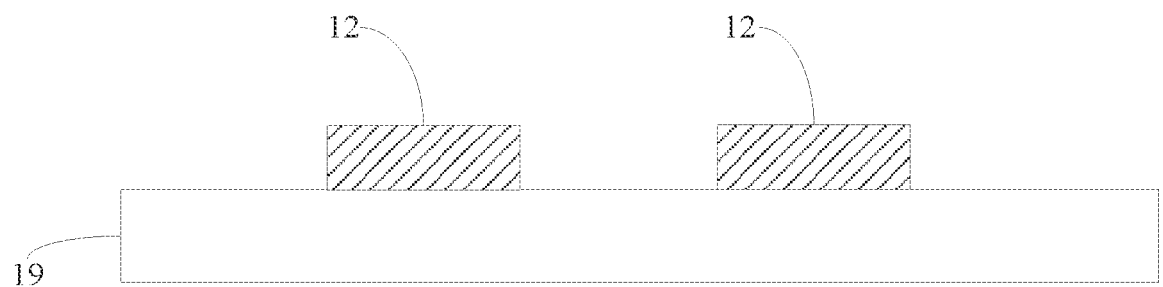
FIG. 9 is a sectional view taken along the direction A-A in FIG. 3A, in accordance with embodiments of the present disclosure.

In S401, the first conductive film is etched to form at least one first conductive unit 25, and the first conductive unit 25 includes the first conductive body 12 as shown in FIG. 9.

In S402, a second insulating layer 20 covering each first conductive unit is formed.

Figure 10:
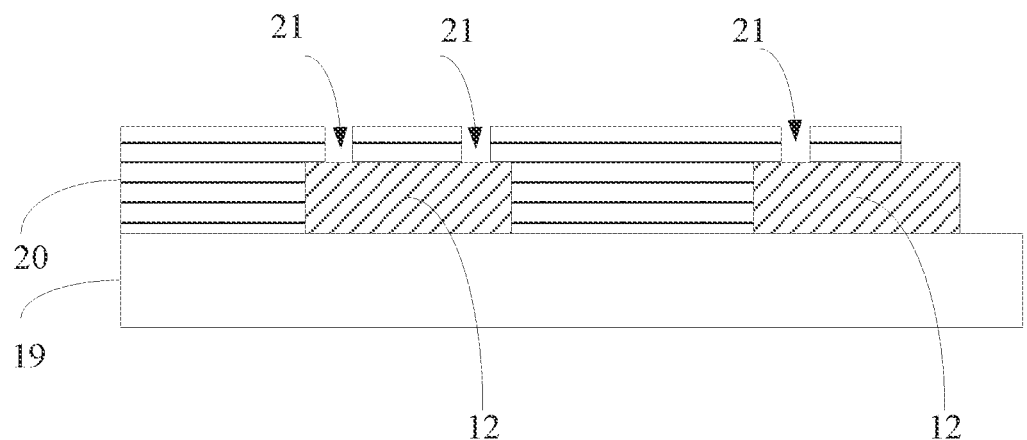
FIG. 10 is another sectional view taken along the direction A-A in FIG. 3A, in accordance with embodiments of the present disclosure.

In S403, the second insulating layer 20 is etched to form at least one through hole 21 on the second insulating layer 20; and the through hole 21 exposes a portion of the first conductive unit, that is, the portion of the first conductive body 12 is exposed as shown in FIG. 10.

In S404, a second conductive film is formed, and the second conductive film includes a conductive connection portion 14 filled in the through hole 21 and a conductive layer covering the second insulating layer 20.

Figure 11:
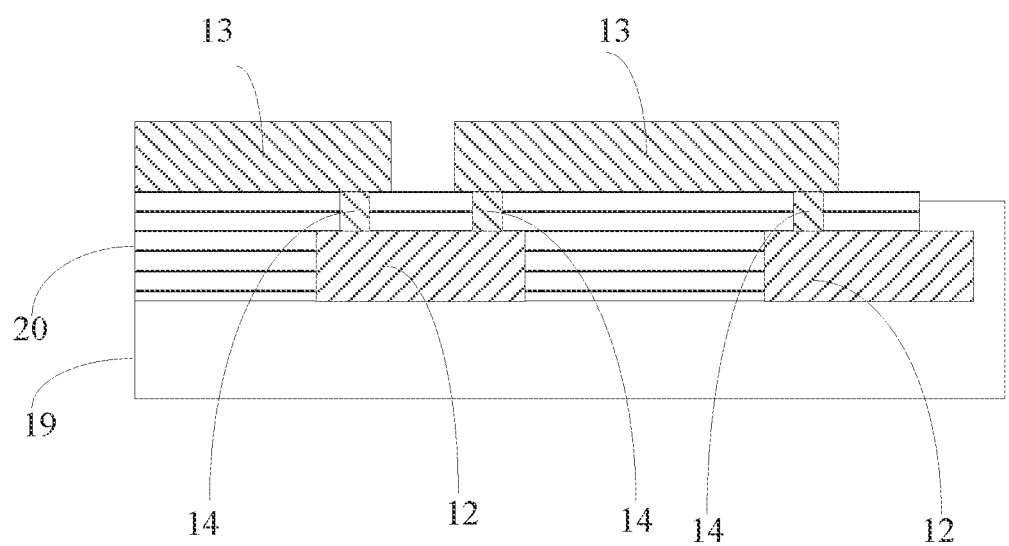
FIG. 11 is yet another sectional view taken along the direction A-A in FIG. 3A, in accordance with embodiments of the present disclosure.

In S405, the conductive layer is etched to form at least one second conductive unit 26; the second conductive unit is connected to the first conductive unit through a conductive connection portion 14. Specifically, the second conductive unit may include a second conductive body 13, and the second conductive body 13 is connected to the first conductive body 12 through the conductive connection portion 14 as shown in FIG. 11.

In S406, a protective layer 22 covering each second conductive unit is formed as shown in FIG. 3B.

A person skilled in the art will easily think of other embodiments of the present application after considering the specification and practicing the invention disclosed herein. This application is intended to cover any variations, uses or adaptations of the present application, and these variations, uses, or adaptations follow the general principles of the present application and include common knowledge or conventional technical means in the technical field that are not disclosed in the present application. The description and embodiments are only regarded as exemplary, and the true scope and spirit of the application are pointed out by the appended claims.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A touch structure, comprising: at least one touch electrode strip, each touch electrode strip including a plurality of electrically connected touch electrodes;
at least one touch electrode including:
a first conductive layer including at least one first conductive unit;
a second insulating layer covering the first conductive layer, the second insulating layer being provided with at least one through hole therein to expose a portion of each first conductive unit;
a second conductive layer formed on the second insulating layer, the second conductive layer including at least one second conductive unit; and
at least one conductive connection portion, each conductive connection portion being disposed in one through hole, and two ends of the conductive connection portion being connected to one second conductive unit and one first conductive unit, respectively, wherein
each first conductive unit has first overlapping portions, each second conductive unit has second overlapping portions, orthographic projections of the second overlapping portions and the first overlapping portions on the second insulating layer coincide, and the conductive connection portion connects a first overlapping portion and a second overlapping portion;
the at least one first conductive unit and the at least one second conductive unit are arranged in at least one row, and each first conductive unit and each second conductive unit in each row are alternately arranged in a first direction;
orthographic projections of a first overlapping portion of the first conductive unit and a second overlapping portion of a second conductive unit that is adjacent to the first conductive unit in the first direction on the second insulating layer coincide, and the first overlapping portion and the second overlapping portion are connected through a conductive connection portion;
the first conductive unit includes a first conductive body extending in the first direction, and the first conductive body has the first overlapping portions;
the second conductive unit includes a second conductive body extending in the first direction, and the second conductive body has the second overlapping portions;
wherein orthographic projections of a first overlapping portion of the first conductive body and a second overlapping portion of a second conductive body that is adjacent to the first conductive body in the first direction on the second insulating layer coincide, and the first overlapping portion and the second overlapping portion are connected through the conductive connection portion;
the first conductive unit further includes a first electrical connection body extending in a second direction, and the first electrical connection body is connected to the first conductive body;
the second conductive unit further includes a second electrical connection body extending in the second direction, and the second electrical connection body is connected to the second conductive body; and the second direction and the first direction intersect;
the at least one row includes a plurality of rows;
every two adjacent conductive units are first conductive units or second conductive units in the second direction; and
every two adjacent first conductive units are directly connected, and every two adjacent second conductive units are directly connected in the second direction.

2. The touch structure according to claim 1, wherein first electrical connection bodies of every two adjacent first conductive units are directly connected in the second direction; and second electrical connection bodies of every two adjacent second conductive units are directly connected in the second direction.

3. The touch structure according to claim 1, wherein the second direction and the first direction are perpendicular to each other.

4. The touch structure according to claim 2, wherein in a same first conductive unit, orthographic projections of a central region of a first electrical connection body and a central region of a first conductive body on the second insulating layer coincide; and in a same second conductive unit, orthographic projections of a central region of a second electrical connection body and a central region of a second conductive body on the second insulating layer coincide.

5. The touch structure according to claim 1, wherein the touch electrode further includes a conductive frame surrounding and electrically connecting each first conductive unit and each second conductive unit included in the touch electrode.

6. The touch structure according to claim 1, further comprising: a first insulating layer, the first insulating layer being located on a side of the first conductive layer facing away from the second insulating layer.

7. The touch structure according to claim 1, further comprising a protective layer covering the second conductive layer.

8. The touch structure according to claim 1, wherein the at least one touch electrode strip includes:

a first touch electrode strip including a plurality of first touch electrodes arranged in a third direction, the first touch electrodes being electrically connected; and a second touch electrode strip including a plurality of second touch electrodes arranged in a fourth direction, the second touch electrodes being electrically connected; wherein the fourth direction and the third direction intersect, each first touch electrode and each second touch electrode are insulated from each other, and at least one of the first touch electrode and the second touch electrode is the touch electrode.

9. The touch structure according to claim 8, further comprising:

a plurality of first bridge portions;

a plurality of second bridge portions;

a plurality of intermediate insulating layers disposed in a same layer as the second insulating layer, each intermediate insulating layer being disposed between a first bridge portion and a respective second bridge portion, wherein the first touch electrode and the second touch electrode have a gap therebetween, adjacent first touch electrodes are electrically connected through a first bridge portion, and adjacent second touch electrodes are electrically connected through a second bridge portion; and the first bridge portion and one of the first conductive unit and the second conductive unit are disposed in a same layer, and the second bridge portion and another of the first conductive unit and the second conductive unit are disposed in a same layer.

10. The touch structure according to claim 9, wherein the first bridge portion and a second conductive unit of the first touch electrode are disposed in a same layer, and the first bridge portion is connected to second conductive units of adjacent first touch electrodes; and the second bridge portion and a first conductive unit of the second touch electrode are disposed in a same layer, and the second bridge portion is connected to first conductive units of adjacent second touch electrodes;

or the second bridge portion and a first conductive unit of the second touch electrode are disposed in a same layer, and the second bridge portion is connected to second conductive units of adjacent second touch electrodes through via holes in the intermediate insulating layer.

11. A touch display panel, comprising the touch structure according to claim 1.

12. A touch display apparatus, comprising the touch display panel according to claim 11.

13. A touch structure, comprising: at least one touch electrode strip, each touch electrode strip including a plurality of electrically connected touch electrodes;

at least one touch electrode including:

a first conductive layer including at least one first conductive unit;

a second insulating layer covering the first conductive layer, the second insulating layer being provided with at least one through hole therein to expose a portion of each first conductive unit;

a second conductive layer formed on the second insulating layer, the second conductive layer including at least one second conductive unit; and at least one conductive connection portion, each conductive connection portion being disposed in one through hole, and two ends of the conductive connection portion being connected to one second conductive unit and one first conductive unit, respectively, wherein each first conductive unit has first overlapping portions, each second conductive unit has second overlapping portions, orthographic projections of the second overlapping portions and the first overlapping portions on the second insulating layer coincide, and the conductive connection portion connects a first overlapping portion and a second overlapping portion;

the at least one first conductive unit and the at least one second conductive unit are arranged in at least one row, and each first conductive unit and each second conductive unit in each row are alternately arranged in a first direction;

orthographic projections of a first overlapping portion of the first conductive unit and a second overlapping portion of a second conductive unit that is adjacent to the first conductive unit in the first direction on the second insulating layer coincide, and the first overlapping portion and the second overlapping portion are connected through a conductive connection portion;

the first conductive unit includes a first conductive body extending in the first direction, and the first conductive body has the first overlapping portions;

the second conductive unit includes a second conductive body extending in the first direction, and the second conductive body has the second overlapping portions;

wherein orthographic projections of a first overlapping portion of the first conductive body and a second overlapping portion of a second conductive body that is adjacent to the first conductive body in the first direction on the second insulating layer coincide, and the first overlapping portion and the second overlapping portion are connected through the conductive connection portion;

the first conductive unit further includes a first electrical connection body extending in a second direction, and the first electrical connection body is connected to the first conductive body;

the second conductive unit further includes a second electrical connection body extending in the second direction, and the second electrical connection body is connected to the second conductive body; and the second direction and the first direction intersect;

the at least one row includes a plurality of rows;

every two adjacent conductive units are a first conductive unit and a second conductive unit in the second direction;

the first conductive unit further has third overlapping portions, and the second conductive unit further has fourth overlapping portions; and orthographic projections of a third overlapping portion of the first conductive unit and a fourth overlapping portion of a second conductive unit that is adjacent to the first conductive unit in the second direction on the second insulating layer coincide, and the third overlapping portion and the fourth overlapping portion are connected through the conductive connection portion.

14. The touch structure according to claim 13, wherein the first electrical connection body has the third overlapping portions, and the second electrical connection body has the fourth overlapping portions; wherein orthographic projections of the third overlapping portion of the first electrical connection body and the fourth overlapping portion of the second electrical connection body that is adjacent to the first electrical connection body in the second direction on the second insulating layer coincide, and the first overlapping portion and the second overlapping portion are connected through the conductive connection portion.

15. The touch structure according to claim 14, wherein in a same first conductive unit, orthographic projections of a central region of a first electrical connection body and a central region of a first conductive body on the second insulating layer coincide; and in a same second conductive unit, orthographic projections of a central region of a second electrical connection body and a central region of a second conductive body on the second insulating layer coincide.

16. A touch display panel, comprising the touch structure according to claim 13.

17. A touch display apparatus, comprising the touch display panel according to claim 16.

* * * * *